Oct. 22, 1963    J. GRAHAM    3,107,760
SUN VISOR FOR WINDOW
Filed July 13, 1961    3 Sheets-Sheet 1

INVENTOR.
JOHN GRAHAM
BY Barnes & Seed
ATTORNEYS

Oct. 22, 1963   J. GRAHAM   3,107,760
SUN VISOR FOR WINDOW
Filed July 13, 1961   3 Sheets-Sheet 2
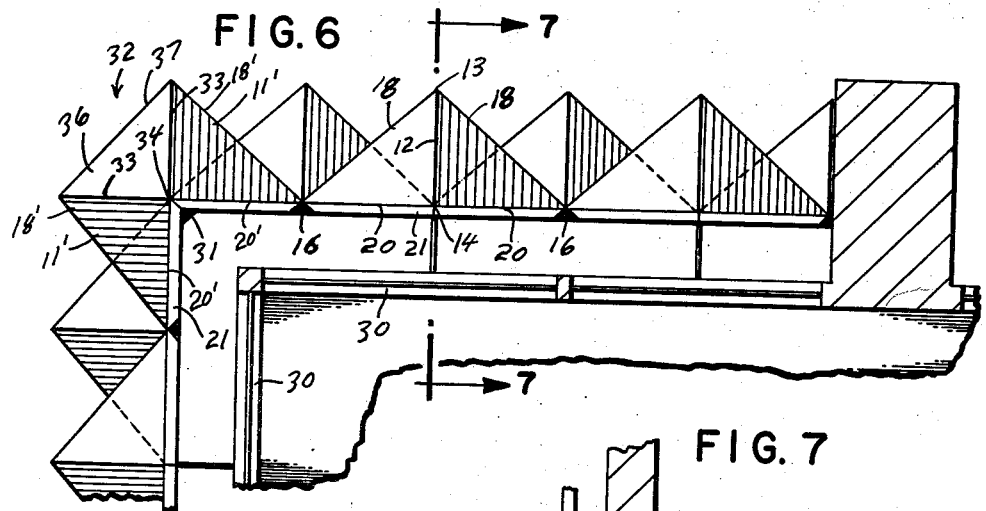
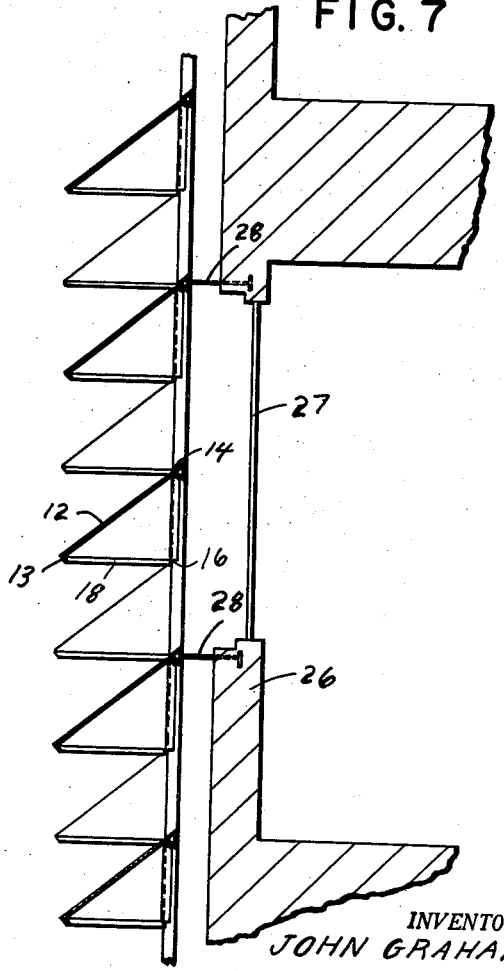
INVENTOR.
JOHN GRAHAM
BY Barnes + Seed
ATTORNEYS Oct. 22, 1963  J. GRAHAM  3,107,760
SUN VISOR FOR WINDOW
Filed July 13, 1961  3 Sheets-Sheet 3

INVENTOR.
JOHN GRAHAM
BY Barnes & Seed
ATTORNEYS

United States Patent Office 3,107,760
Patented Oct. 22, 1963

3,107,760
SUN VISOR FOR WINDOW
John Graham, 1426 5th Ave., Seattle, Wash.
Filed July 13, 1961, Ser. No. 123,857
4 Claims. (Cl. 189—63)

This invention relates to a sun shade, and more particularly to a relatively permanent sun shade structure which is adapted to front a building wall, so as to become a permanent adjunct thereto.

The general object of this invention is to provide a fixed sun shade structure that furnishes ample outdoors visibility for those located inside the building, and yet gives the building interior a large degree of shading from the direct rays of the sun.

Ancillary to the above object is that of providing a structure that gives adequate shading regardless of the vertical or horizontal angle of the sun's rays.

More specifically, this structure purports to provide at least a fair degree of shading when the sun is low on the horizon, e.g. in the morning or evening hours, and to provide complete shading when the sun is higher in the sky and the sun's rays are more intense.

Further, it is an object to provide a structure which provides effective shading regardless of the direction which the shaded building wall faces.

Yet another object is to provide a sun shade structure which accomplishes the above mentioned objects and yet presents an exterior design of pleasing overall appearance.

A further object is that of providing a sun shade structure comprising a plurality of simple elements which are economical to manufacture and which are easily and efficiently installed on a building wall.

This and other objects will appear and be understood in the course of the following description and claims, the invention consisting in the novel construction and in the adaptation and combination of parts hereinafter described and claimed.

In the accompanying drawings:

FIG. 6 is a fragmentary top plan view showing a composite sun shade structure in accordance with my invention, which is fronting a corner window of two adjoining building walls;

FIG. 7 is a fragmentary longitudinal vertical sectional view taken on line 7—7 of FIG. 6;

Figure 1:
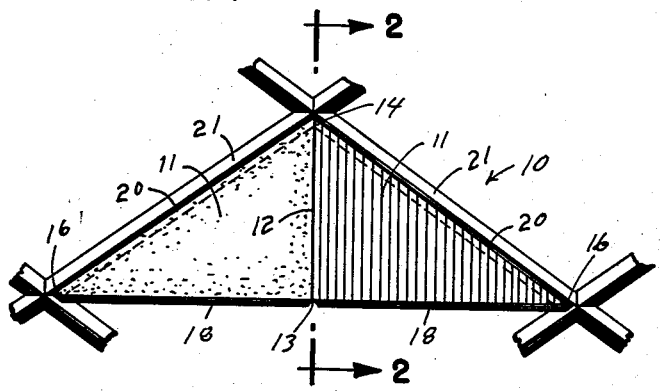
FIGURE 1 is a front elevational view of a sun shade element of my invention.
Figure 2:
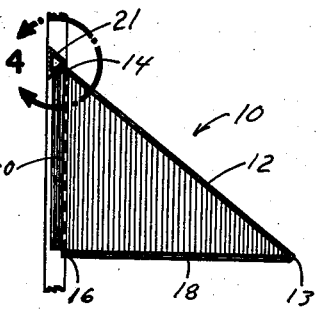
FIG. 2 is a longitudinal vertical sectional view taken on line 2—2 of FIG. 1.
Figure 3:
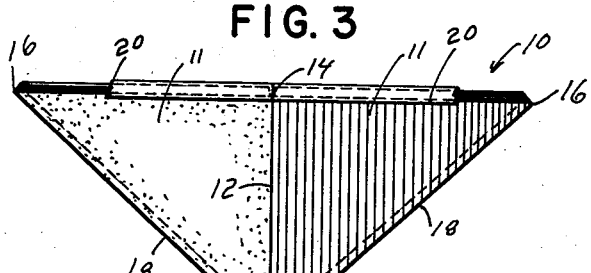
FIG. 3 is a top plan view of the sun shade of FIG. 1.
Figure 4:
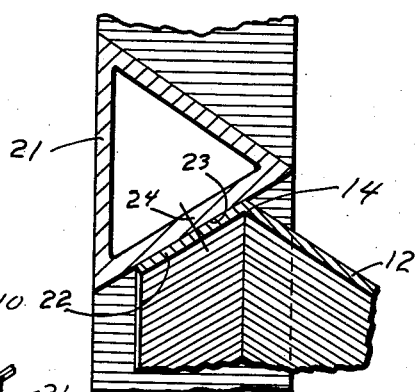
FIG. 4 is a fragmentary longitudial vertical sectional view detailing the portion circled at 4 in FIG. 2.
Figure 5:
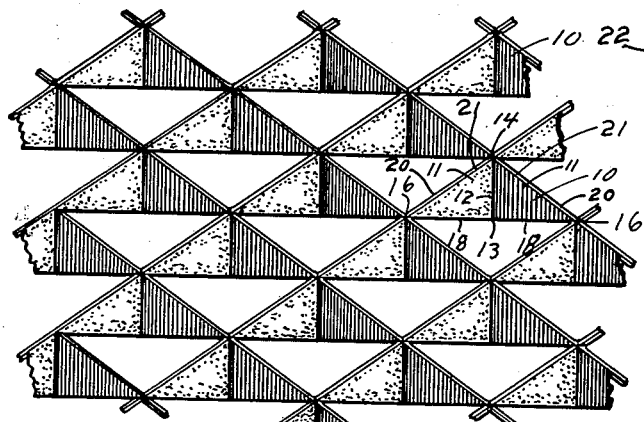
FIG. 5 is a fragmentary front elevational view in which a plurality of the sun shade elements are combined to form a composite sun shade structure in accordance with preferred teachings of my invention.
Figure 8:
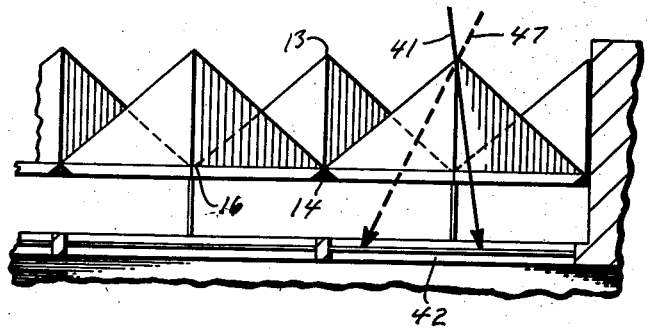
FIG. 8 is a fragmentary top plan view of a sun shade structure illustrating first in a full line arrow and then in a broken line arrow the horizontal angle of approach of the sun's rays in accordance with two examples of sun location selected to show the shading effect of the structure.
Figure 11:
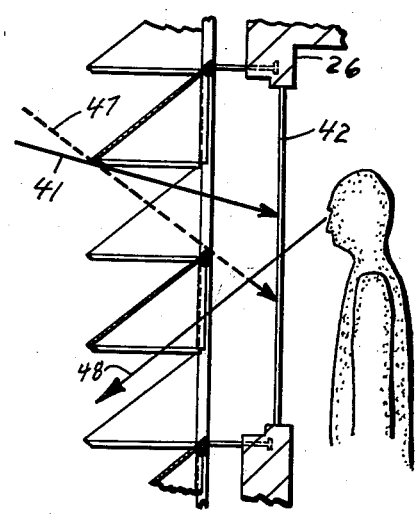
Figure 10:
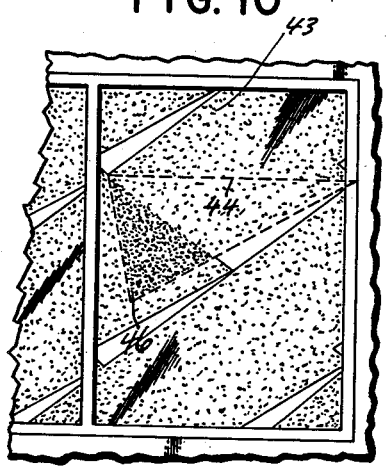

FIG. 10 is an elevational view from inside the building structure of a window of the building wall, illustrating the shade pattern which the sun shade structure creates on a window when the sun's rays are travelling in a direction indicated by the broken line arrow of FIGS. 8 and 11; and FIG. 11 is a side elevational view of a sun shade structure with its associated building wall illustrating first in a full line arrow and then in a broken line arrow the vertical angle of approach of the sun's rays in accordance with the two selected examples which illustrate the shading effect of the sun shade structure.

Referring to the accompanying drawings, numeral 10 designates generally a single sun shade element, referred to herein as a visor element. Each visor is a symmetrical flat metal piece which is bent along the axis of symmetry 12 to form two congruent triangles 11 which meet at an angle other than 180°. Each of two apices from one triangle is adjacent its identical apex of the other triangle at a front and a rear apical juncture point 13 and 14, respectively, with the third apical points 16 lying one at each terminal end of the visor. The lower or front edge of each triangle which reaches from the front apical juncture point 13 to the outer point 16 is designated 18, and each edge line defined by the rear apical juncture point 14 and the point 16 is the rear or upper edge designated 20. It should be noted that the visor is so formed that the plane defined by the intersecting rear edge lines 20 is perpendicular to the plane defined by the front edge lines 18.

The sun shade structure comprises a plurality of these visor elements 11 arranged in horizontal rows. The back edge lines 20 of each visor all lie in a single vertical plane, with the front apical points 13 all being directed outwardly. The front edge lines 18 of the visors of any one row lie all in a single horizontal plane. Thus the bend line 12 forms an exposed ridge from which each side portion 11 diverges in a descending slope. Each alternate row is staggered by half the distance between the points 16 of one visor so that the rear apical point 14 of any one visor joins the adjacent apical points 16 of two adjoining visors from the row immediately above.

To mount these visors 10, there is provided a vertical lattice work whose overall geometrical configuration may be described as comprising one set of evenly spaced parallel diagonal lines which intersect at cross angles a similar but oppositely sloping set of diagonal lines to form a regular pattern of adjoining diamond-shaped parallelograms. The sides of each parallelogram are defined by a set of four identical tubular struts 21 of triangular section which are connected one to another at their ends. Each of such diamond-shaped sections joins at its apical points to the four adjacent sections, so that any one strut defines a side of two adjacent lattice sections.

Each visor fits into the upper portion of a related lattice section. The angle formed by the two rear edge lines 20 is equal to the upper inside angle of its related lattice section. Thus the rear edges 20 fit against the two struts 21 which define the upper inside angle, with the end points 16 and the juncture point 14 of the visor being adjacent, respectively, the side apices and the top apex of the lattice section. To secure the visors in this location, each has extending from each of its rear edges 20 a lip 22 which overlies a face 23 of its adjacent strut and is fastened thereto by suitable means indicated at 24.

The composite structure of the visors 10 with the supporting lattice fronts a building wall 26 having windows 27 and is or may be joined thereto by bolts 28 embedded in the wall structure. The lattice frame is desirable spaced a moderate distance from the wall, with the front points 13 of the visors 10 extending outwardly therefrom.

In FIG. 6 is shown a corner window wherein the two window panels 30 which meet at cross angles are each fronted by a related shade structure, each of which have matching rows of visor elements. At the juncture 31 of the two lattice structures, where alternate matching rows are half a visor length short of the lattice juncture line, there is provided a modified visor element 32. This visor 32 is formed from a flat symmetrical piece but is bent along two lines 33 to form three triangular portions, all having a common juncture point 34 for one apex of each triangle. The two outer triangular portions are similar in shape and in function to the triangular portion 11 of the visors 10, and are designated 11'. The central triangular portion 36 is isosceles and reaches diagonally between the inside edge lines 33 of the triangles 11'. The visor 32 joins to related struts 21, one from each lattice, at the inside upper edge lines 20' of each triangular portion 11', with the apical juncture point 34 being contiguous to the lattice juncture line 31. The lower front edge lines 18' and 37 of the three triangular portions lie in the same horizontal plane as the edge lines 18 of the two related rows of visors which the visor 32 joins.

To illustrate the operation of this sun shade structure, attention is directed to FIGS. 8–11, wherein is illustrated two selected examples of the shading effect produced from the sun's rays for two different sun locations.

In the first example, the path of the sun's rays are shown by the full line arrow 41. The direction or horizontal angle of the rays, as seen from FIG. 8, places the sun slightly to the left of a location directly in front of the window 42, and the vertical angle, as seen in FIG. 11, locates the sun fairly low on the horizon.

Figure 9:
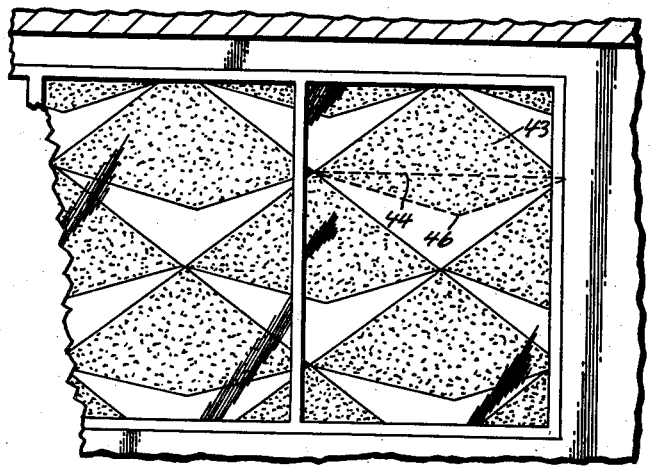
FIG. 9 is an elevational view from inside the building structure of a window of the building wall, illustrating the shading effect which the sun shade structure creates on said window when the sun's rays are travelling in a direction indicated by the full line arrow of FIGS. 8 and 11.

The shade pattern which the sun's rays would project on the window is shown in FIG. 9, the spackled portion being the area shaded from the direct rays and the unspackled portion receiving the direct sunlight. It should be noted that each visor projects a shaded section which may be described as comprising an upper triangle 43 which is an exact trace of a visor section in vertical profile, and comprising a lower inverted triangle having one side 44 in common with the upper triangle 43. However, the lower triangle 44 changes, depending upon the sun's position, the apex 46 of this triangle 44 being situated inversely with respect to the location of the sun. That is to say as the sun rises, the point 46 drops and as the sun moves to the right the point 46 moves to the left.

Thus in the second selected example, wherein the path of the sun's rays are illustrated by the broken line arrow 47 of FIGS. 8 and 11, the sun is located higher in the sky and to the right relative to the sun location of the first example. The shade pattern of this second example is illustrated in FIG. 10, showing the apex point 46 moved downward and to the left. For purposes of illustration, where the shade pattern of one visor overlaps that of another, the shading is indicated by a heavier spackle, but in actuality, the shading would of course be fairly uniform throughout.

Thus it can be seen that as the sun rises higher in the sky, the shaded area is increased until at a position where the sun is moderately high, complete shading is accomplished. Even with the sun extremely low on the horizon, so that the sun's rays travel on a substantially horizontal path, at least half shading is still achieved, regardless of the direction of the sun's rays.

With respect to the visibility of those within the building looking out, the horizontal view is restricted to half visibility. However, the view of a person looking downwardly at a moderate angle, as illustrated by the outwardly directed arrow 48, is almost completely unobstructed.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A sunshade structure to front a building wall having a plurality of sunshade elements and means to support said elements at a location fronting said building wall, each of said elements comprising a symmetrical planar member bent along the axis of symmetry to form two downwardly and rearwardly sloping congruent triangles, each of two apices from one triangle being each adjacent its identical apex of the other triangle at respective front and rear apical juncture points, the plane defined by the rear apical juncture point and the third apex from each triangle being perpendicular to the plane defined by the front apical juncture point and each of the third apices, said shade elements arranged in staggered horizontal rows with the rear apical juncture point of any one element in any one row being adjacent to contiguous third apical points of two proximate elements in the next upper row, said shade elements being joined to a building wall with the rear apical juncture points and the third apical points of the elements lying in a common plane parallel with the building wall, and the front apical juncture points and the third apical points of the elements in any one row lying in a common plane which is perpendicular to the building wall.

2. A sunshade assembly comprising in combination, a sunshade structure to front a building wall, said structure having a plurality of sunshade elements, each of said elements comprising a symmetrical planar member bent along the axis of symmetry to form two downwardly and rearwardly sloping congruent triangles, each of two apices from one triangle being each adjacent its identical apex of the other triangle at respective front and rear apical juncture points, the plane defined by the rear apical juncture point and the third apex from each triangle being perpendicular to the plane defined by the front apical juncture point and each of the third apices, said shade elements arranged in staggered horizontal rows with the rear apical juncture point of one element in one row being adjacent to contiguous third apical points of two proximate elements in the next upper row, said shade elements being joined to a building wall with the rear apical juncture points and the third apical points of the elements lying in a common plane parallel with the building wall, and the front apical juncture points, and the third apical points of the elements in any one row lying in a common plane which is perpendicular to the building wall, and a second sunshade structure similar to said first named structure and joining said first structure at a building corner, the rows of each structure matching with the rows of the other, a modified sunshade element fitting at the juncture of said two structures to join alternate matching rows of elements, said modified element comprising a planar piece bent along two lines to form one middle and two outer triangular portions, all having a common juncture point for one apex of each triangle, the two outer triangles being similar to said aforementioned congruent triangles, one outer triangle fitting in a row of one sunshade structure and the other in a row of the other sunshade structure, the middle triangle reaching in a diagonal plane between said outer triangles, the common apical juncture point fitting against the juncture line of the two structures, the other apices of said outer and middle triangles all lying in the same plane as the front apical juncture points and outer apical points of the other elements in the two related adjoining rows and means to support all of said elements at their respective locations.

3. A sunshade structure to front a building wall, said structure having a plurality of sunshade elements, each of said elements comprising a symmetrical planar member bent along the axis of symmetry to form two downwardly and rearwardly sloping congruent triangles, each of two apices from one triangle being each adjacent its identical apex of the other triangle at respective front and rear apical juncture points, the plane defined by the rear apical juncture point and the third apex from each triangle being perpendicular to the plane defined by the front apical juncture point and each of the third apices, said shade elements arranged in staggered horizontal rows with the rear apical juncture point of one element in any one row being adjacent to contiguous third apical points of two elements in the next upper row, a lattice having a plurality of lattice members, each of which has a longitudinal axis to mount said elements adjacent a building wall, the overall geometrical configuration of the axes of said lattice members being one set of parallel diagonal lines and a second similar set of oppositely sloping diagonal lines crossing the first set at cross angles to form a regular pattern of lattice sections formed as diamond shaped parallelograms each having upper, lower and side apices, each of said elements fitting into a related lattice section so that the rear apical juncture point fits into the upper apex of the lattice section, with the rear apical juncture points and the third apical points of the elements lying in a common plane parallel with the building wall, and the front apical juncture point and the third apical points of the elements in any one row lying in a common plane which is perpendicular to the building wall.

4. A sun shade structure to front a building wall comprising a plurality of visor elements and means to support said visor elements at a location fronting said building wall, each visor comprising two planar triangular portions, said two triangles sharing a common side and having common front and rear apical points, the planes of said triangular portions meeting at an angle other than 180° and diverging from said common side rearwardly and downwardly to terminate each at a respective outer apical point, the two lines defined by the front juncture point and the outer apical points diverging from said front juncture point rearwardly, said visors arranged in staggered rows so that adjoining outer apices, one from each of two adjacent elements in any one row, meet at the rear apical juncture point of the proximate element in the next lower row, the rear apical juncture points and the outer apical points of the visors lying in a common plane, and the front apical juncture points of the several visors lying in a plane parallel to the last-named plane.

References Cited in the file of this patent
UNITED STATES PATENTS

| | | |
|---|---|---|
| 732,828 | Christopher | July 7, 1903 |
| 879,426 | Townsend | Feb. 18, 1908 |
| 2,990,923 | Macias-Sarria | July 4, 1961 |